United States Patent [19]

Lindner et al.

[11] 3,773,012
[45] Nov. 20, 1973

[54] COLLAPSIBLE ASSEMBLY

[75] Inventors: Henry Lindner, Wood Dale; James D. Kennedy, Streamwood, both of Ill.

[73] Assignee: Beatrice Foods Co.-Elgin Molded Plastics Div., Elgin, Ill.

[22] Filed: Apr. 16, 1973

[21] Appl. No.: 351,309

[52] U.S. Cl. ............................. 116/63 P, 40/125 N
[51] Int. Cl. .............................................. E01f 9/10
[58] Field of Search ........................... 116/63, 63 P; 40/125 N; 350/97; 404/9, 10

[56] References Cited
UNITED STATES PATENTS
3,600,059  8/1971  Evans ........................... 116/63 P X FOREIGN PATENTS OR APPLICATIONS
1,112,672  5/1968  Great Britain ..................... 116/63 P
1,383,436  11/1964  France ............................. 116/63 P Primary Examiner—Louis J. Capozi
Attorney—Carlton Hill et al.

[57] ABSTRACT

A collapsible assembly usable as a warning device, as for a vehicle stalled on a thoroughfare. The assembly has three leg members which coact to form a triangle. End portions of each leg member are fitted with hinge means adapting the assembly to exist either in an assembled configuration or in a collapsed configuration. When collapsed, the assembly has hinge means disconnected. In the event of breakage, individual leg members can be replaced separately.

6 Claims, 9 Drawing Figures

PATENTED NOV 20 1973 3,773,012

COLLAPSIBLE ASSEMBLY

BACKGROUND OF THE INVENTION

Rear end collisions between on-coming traffic and disabled vehicles causes many deaths and injuries annually. Various governmental bodies are establishing standards for warning devices to be carried in motor vehicles and to be used by the driver if vehicle stalls to warn approaching traffic of the presence of his stopped vehicle:

At the present time, it appears that a warning device having a triangular appearance and adapted to be assembled into an upright position from a collapsed, storage configuration in a simple and rapid manner will come into wide use in the near future; see for example, United States Government Motor Vehicle Safety Standard No. 125 (effective Jan. 1, 1974). The construction and the assembly in terms of performance characteristics, of such a warning device have been rather carefully set forth by the government (see for example, the above-referenced Standard No. 125).

One problem associated with such triangular warning devices and their manufacture has been the provision of an appropriate and adequate means permitting one to rapidly assemble such a device from a collapsed condition into an operable condition, and, further, to have, in such an operable, assembled device, the desirable and necessary structural rigidity and reliability at those positions in such device where movement of one element relative to another must occur during assembly and disassembly.

Another problem associated with such warning devices has been the fact that, should a portion of the triangular assembly of such a device even be injured or damaged, it was heretofore necessary to replace the entire such triangular assembly, a circumstances which further adds to adds to the already considerable expense of owning and operating a motor vehicle.

BRIEF SUMMARY OF THE INVENTION

The present invention is concerned with a collapsible assembly adapted for use as a roadway warning device, and is intended to provide in such a device improvements which overcome the problems above-mentioned associated with prior art warning devices of the type.

Specifically, the present invention provides a simple, effective, and economical technique for fabricating a triangular assembly useful as a warning device. The device itself can be rapidly assembled to an operative condition and disassembled to a collapsed condition, and vice versa, without in any way interfering with, or detracting from, desirable rigidity and reliability properties. Indeed, the present invention sofar as is known to us, provides an improvement over all comparable devices of this same type as respects these properties.

Furthermore, the present invention enables one to replace a leg portion of a triangular warning device without having to replace the entire triangular assembly of such device, the replacement being accomplished without in any way impairing the desirable functional properties of the device.

Other and further objects will be apparent to those skilled in the art from a reading of the present specification taken together with the drawings and claims.

BRIEF DESCRIPTION OF THE DRAWINGS

In the drawings:

FIG. 7 is a plan view of the device shown in FIG. 1 which has been disassembled into a collapsed position for storage or the like;

DETAILED DESCRIPTION

Figure 1:
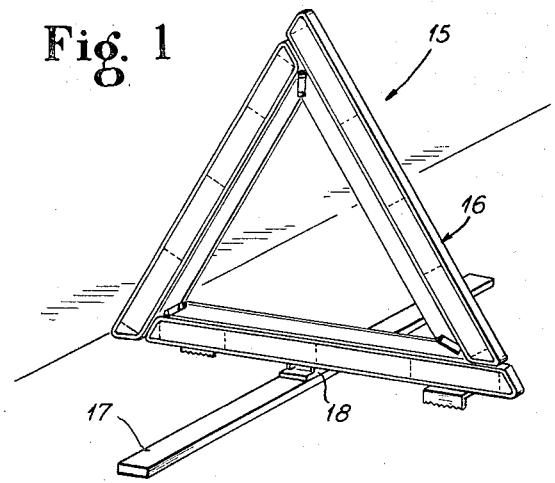
FIG. 1 shows a perspective view of one embodiment of a warning device incorporating the principles of the present invention.
Figure 2:
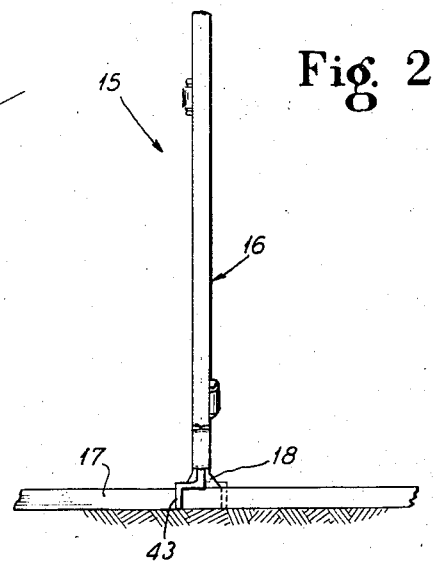
FIG. 2 is a view in side elevation of the embodiment shown in FIG. 1.

Turning to FIGS. 1 and 2, there is seen a warning device incorporating the principles of the present invention, such device being designated in its entirety by the numeral 15. Device 15 is seen to comprise a triangular assembly, which is designated in its entirety by the numeral 16, a pedestal 17, and a pivot means 18. Device 15 is shown in an assembled configuration wherein the triangular assembly 16 is mounted on pedestal 17, but is pivoted on pivot means 18 to extend normally to pedestal 17.

Figure 3:
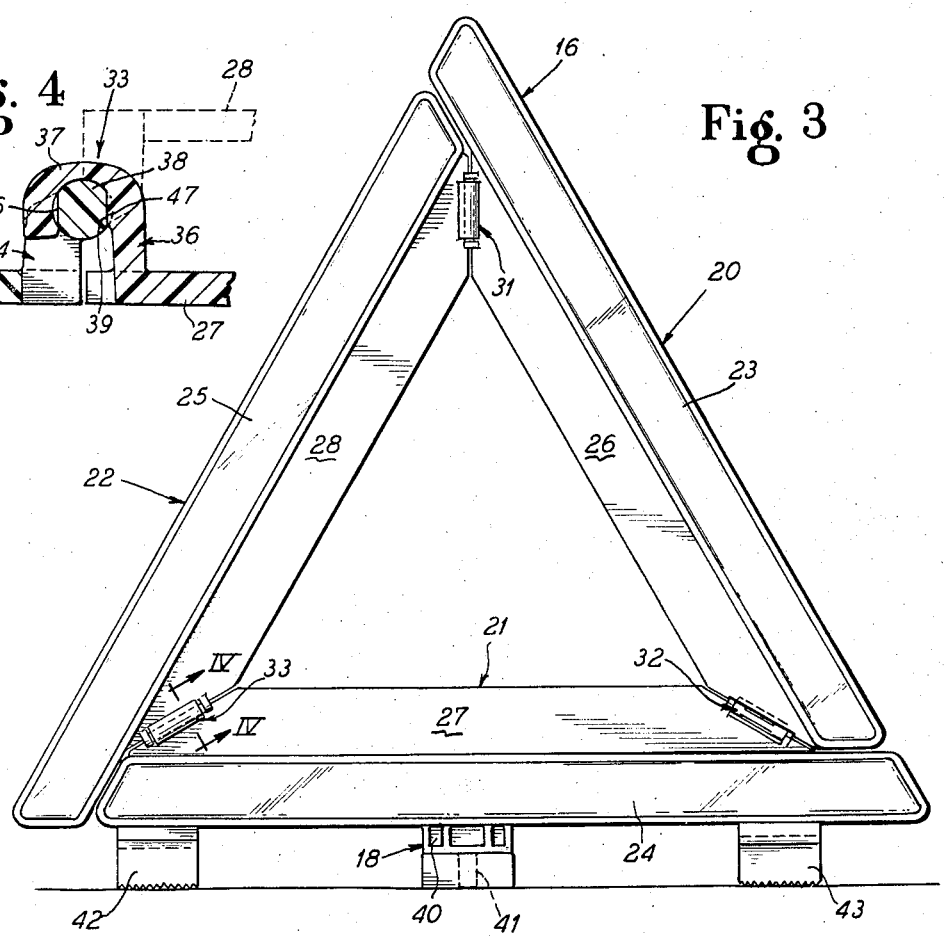
FIG. 3 is a detailed view in front elevation of the embodiment shown in FIG. 1.

Referring to FIG. 3, triangular assembly 16 is seen to incorporate three leg members, ehrein each designated in its entirety by the respective numerals 20, 21 and 22. The leg members 20, 21 and 22 are adapted to coact together in abutting end-to-end relationship to form triangular assembly 16. Each leg member 20, 21 and 22 has an outside perimeter portion 23, 24 and 25, respectively, which is thickened relative to the adjacent inside perimeter portion 26, 27 and 28, respectively, of each leg 20, 21 and 22. This constructional arrangement for legs 20, 21 and 22 of the triangular assembly 16 in a warning device 15 has been established by governmental agencies; see, for example, Motor Vehicle Safety Standard No. 125.

Thus, for example, the outside perimeter portion 23, 24 and 25 of leg members 20, 21 and 22, respectively, has an outer border of red reflex reflective material of uniform width which is not less than 0.75 nor more than 1.75 inches wide, and the inside perimeter portion 26, 27, and 28 of leg members 20, 21 and 22, respectively, has an inner border of orange fluorescent material of uniform width not less than 1.25 and not more than 1.30 inches wide, according to the indicated Safety Standard No. 125. Furthermore, by this same standard, each vertex of the triangular assembly 16 has a radius of not less than 0.25 inches and not more than 0.50 inches, and all edges of triangular assembly 16 are rounded or chamfered, as necessary, to reduce the possibility of cutting or harm to the user. Each of the leg members 20, 21 and 22 of a device 15 by this Standard No. 125 is not less than 17 and not more than 22 inches in length, and is not less than 2 nor more than 3 inches in width. The triangular assembly 16 is in the form of an equilateral triangle that stands in a plane not more than 10° from the vertical, with the lower edge of the base (here leg member 21) of the triangular assembly 16 horizontal and not less than 1 inch above the ground. The color of the red reflective material on a device 15 is defined, as is the color of the orange fluorescent material. Reflectivity and luminance are specified.

In addition, by this standard, device 15, when erected on a horizontal, brushed concrete surface both with and against the brush marks and subjected to a horizontal wind of 40 miles per hour in any direction for three minutes, shall not slide more than three inches from its initial position and its triangular portion 16 shall not tilt to a position which is more than 10° from the vertical. Also, under such conditions, its triangular position shall not turn through a horizontal angle of more than 10° in either direction from an initial position.

Such a device 15 to pass this Standard 125 must be capable of being submitted to a conditioning sequence, before being returned to an ambient temperature condition (68°F)., which includes exposure to −40°F temperatures for 16 hours in a circulating air chamber, exposure to 150°F for 16 hours in a circulating air oven using ambient air, exposure to 100°F and 90 percent relative humidity for 16 hours, exposure to salt spray (fog) in accordance with ASTM test procedure number B-117 Aug. 1964), except that the tests shall be for 4 hours rather than 40 hours, and, finally, immersion for 2 hours in water in a temperature of 100°F. During such conditioning sequence and following same, a warning device 15 must be of such a construction that no part thereof shall become warped or separated from the rest of the device 15. The combination of leg members 20, 21 and 22 with hinge members 31, 32 and 33, respectively, in a warning device 15 of this invention can easily be made to meet such criteria as these just indicated above and still be rigid, stable, durable, collapsible, inexpensive, etc. It is this combination and interaction of elements which constitutes the heart of the present invention rather than such details as concern color, particular materials of construction, techniques for fabricating leg members, or the like, as respects a particular individual embodiment of this invention, although it is naturally preferred to fabricate any embodiment of this invention of the finest quality materials and techniques available. Organic plastics constitute preferred materials for fabrication as those skilled in the art readily appreciate.

Figure 7:
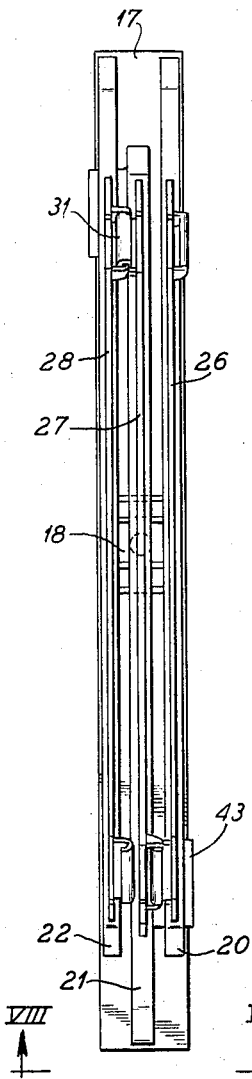
Figure 8:
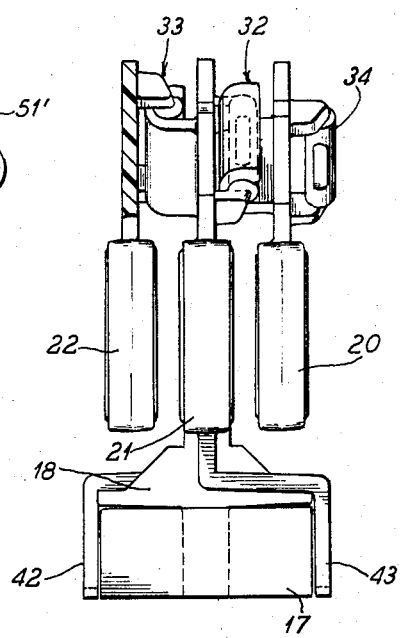
FIG. 8 is an end elevational view of the disassembled device shown in FIG. 7 but taken along the line VIII—VIII of FIG. 7.

Each such hinge member 31, 32 or 33 is adapted to demountably interconnect a different pair of abutting ends of the respective leg members 20, 21 and 22. In addition, each hinge member 31, 32 and 33 is adapted to permit each such abutting pair of leg members to fold from the abutting assembled configuration (such as shown, for example, in FIG. 3) to an adjacent side-by-side disassembled configuration (such as shown, for example, in FIGS. 7 and 8). During such folding, the abutting ends leg pairs joined by their respective hinge members 31, 32 or 33 move about an axis which is generally normal to the third leg member, one of the other hinge members 31, 32 or 33 being demountably disconnected from its associated such abutting leg pair ends. For example, hinge member 31 is disconnected and leg members 20 and 22 are pivoted about hinge members 32 and 33 respectively to bring leg members 22 and 20 into side-by-side relationship to leg member 21, as will be more fully explained hereinafter.

Each hinge member 31, 32 and 33 comprises (referring to FIGS. 4 and 5) a pintle portion 34 and a leaf portion 36. Each pintle portion 34 is rigidly interconnected with one end of each leg member 20, 21 or 22 at the inside perimeter portion 26, 27 or 28, respectively, thereof. Similarly, each leaf portion 36 is rigidly interconnected with the opposite end of each leg member 20, 21 and 22 at the inside perimeter portion 26, 27 and 28, respectively, thereof.

Each leaf portion 36 characteristically has a terminal portion 37 which upstands generally laterally from its associated leg member 20, 21 or 22, and which terminates in a cross sectionally J-shaped, or hook shaped, configuration.

Each pintle portion 34 characteristically has a terminal portion 38 which upstands generally laterally from its associated leg member 20, 21 or 22 and which terminates in a longitudinally extending (relative to the associated leg member) pin configuration. This terminal portion 38 pin configuration is adapted to make mating engagement within the terminal portion 37 of an adjacent leaf portion 36 (see FIG. 4) in an assembled triangular assembly 16. Each of the leaf portions 36 in such an assembled assembly 16 is adapted to exert a yielding spring bias against the terminal portion 38 pin configuration of the (adjacent) pintle portion 34 engaged therewith.

Figure 5:
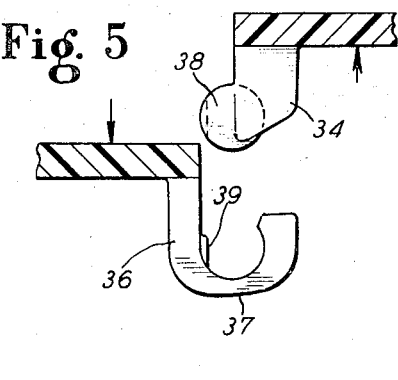
FIG. 5 is a view similar to FIG. 4, but showing such hinge means in a disassembled condition.

A hinge member 31 has its pintle portion 34 conveniently disassembled or disengaged from its associated leaf portion 36 by applying appropriate pressure in respective opposed directions as indicated by the arrows in FIG. 5, the pressures being extended against the end regions of a pair of abutting leg members 20, 21 or 22. Such pintle portion 34 and leaf portion 36 are conveniently reconnected, or re-engaged together by applying a pressure opposite from that indicated by the arrows in FIG. 5, as those skilled in the art will readily appreciate.

Figure 6:
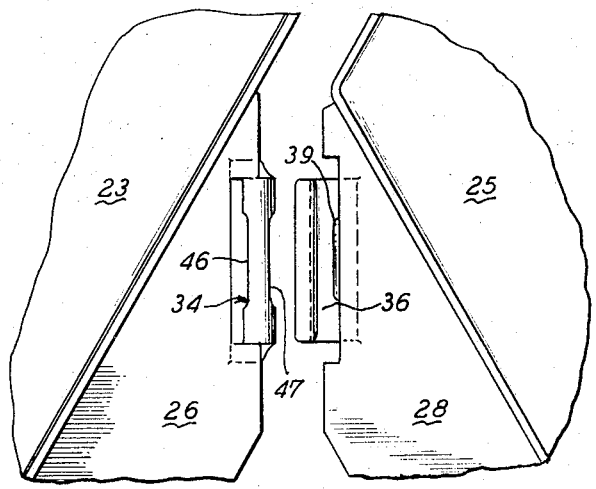
FIG. 6 is a fragmentary, enlarged, detailed view in front elevation similar to FIG. 3, but taken from the reverse direction at the apex of the triangular assembly and showing the abutting leg members adjacent one another but with the hinge means therebetween in a detached, separated condition.

The appearance of a pair of abutting leg members, here chosen for illustrative purposes to be leg members 20 and 22, is shown in FIG. 6, where the respective leg members 20 and 22 are adjacent one another but with the hinge member 31 therebetween having its leaf portion 36 disengaged from its pintle portion 34. In order to provide an outside perimeter which continuously circumscribes the border of triangular assembly 16, the outside perimeter portion 23 of leg member 20 projects beyond the termination of inside perimeter portion 26 at one end of leg member 20, as shown, for example, in FIG. 6, so that the inside edge of the outside perimeter portion 23 lies against an end portion of the outside perimeter portion 25 of leg member 22, while the inside perimeter portion 28 of leg member 22 abutts in a symmetrical manner against the inside perimeter portion 26 of leg member 20. A similar arrangement is used at each of the other two corners of a triangular assembly 16.

When hinge member 31 is disengaged, as shown in FIG. 6, the disassembling of triangular assembly 16 may proceed. Thus, the leg member 20 is pivoted about the pintle portion of hinge member 32 in a direction moving inwardly as respects the paper on which FIG. 3 appears, until the leg member 20 has revolved into a position of side-by-side relationship to the leg member 21. Similarly, the leg member 22 is moved in a direction outwardly as respects the paper on which FIG. 3 appears, until the leg member 22 has revolved into a position which is in side-by-side relationship to the leg member 21 but on the opposed side of leg 21 as respects that on which leg member 20 lies. In this configuration, the triangular assembly 16 may be considered to be in a disassembled condition. Alternatively, if a user desires, hinge 32 or hinge 33 can be opened rather than hinge 31 for a disassembly operation, as those skilled in the art will readily appreciate. However, in the device 15 shown, it is preferred to open the hinge 31 because of the interrelationship in device 15 between the triangular assembly 16 and pedestal 17.

While any convenient means may be employed to mount a triangular assembly 16 upon a pedestal 17, as those skilled in the art will appreciate, in the device 15, a pivot means 40 is provided. Pivot means 39 includes a spacer element attached to the outside edge of outside perimeter portion 24 at the mid portion thereof. A stub shaft 41 projects outwardly from pivot means 40, and stub shaft 41 is adapted to be received in mating engagement in an appropriately formed hole centrally positioned on and in the pedestal 17.

As an added (optional, as respects the present invention) convenience in device 15, a pair of struts 42 and 43 are provided at either end of the leg member 21. Each strut 42 and 43 is in the form of a flat L-shaped member each of whose base portions is attached to a different outside edge of perimeter portion 24 adjacent an end of the leg member 21. The downwardly projecting portion of each strut 42 and 43 is thus adapted to lie in abutting relationship to opposite side portions of the pedestal 17 when a device 15 is in a dissembled condition (see FIGS. 7 and 8). On the other hand, when the device 15 is in an assembled condition, the supports 42 and 43 act as stabilizing arms which rigidify the entire assembly of device 15, as those skilled in the art will readily appreciate.

In a preferred form, a triangular assembly 16 of this invention has the pintle portion 34 and leaf portion 36 of each leg member 20, 21 or 22 integrally formed therewith, as from a single piece of extruded or molded plastic or the like forming inside perimeter portions 26, 27, and 28, respectively.

Figure 4:
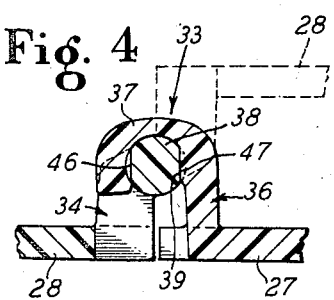
FIG. 4 is a vertical sectional view showing details of the hinge means and taken along the line IV—IV of FIG. 3, some parts thereof broken away, and some parts thereof shown in section.

Also, in a preferred form of triangular assembly 16, each pintle portion 34 has diametrically opposed, longitudinally extending, flattened areas 46 and 47 (as shown in FIG. 4) which provide a locking action tending to rigidify an assembled triangular assembly 16, or even a disassembled triangular assembly 16, owing to the yielding spring bias afforded by an adjacent terminal portion 37 of leaf portion 36.

Figure 9:
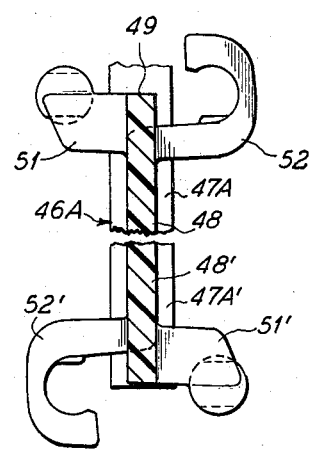
FIG. 9 illustrates a leg member of another embodiment of this invention wherein leg members are symmetrical to one another and have the end portions of each leg member bearing both a pintle portion and a leaf portion of a hinge means.

Further, in a preferred form, each leg member 20, 21 and 22 of a triangular assembly 16 is generally symetrically formed with respect to other leg members, so that each leg member is interchangeable with other leg members. In this type of embodiment (see FIG. 9), each leg member may be substantially identical to the other leg members. In such a leg member, each end portion thereof on its inside perimeter portion has both a pintle portion and a leaf portion each upstanding generally laterally from the associated leg member but in an opposed direction, as shown in FIG. 9. Thus, in this embodiment of FIG. 9, each leg member 46A is substantially identical with the other two leg members of a triangular assembly (not shown for this embodiment) and has an outside perimeter portion 47A and an inside perimeter portion 48. At each end portion 49 thereof on its inside perimeter portion 48 are a pintle portion 51 and a leaf portion 52, the pintle portion 51 and leaf portion 52 being integrally formed with the inside perimeter portion 48. Each leaf portion 52 and each pintle portion 51 are as described earlier in reference to the embodiment of FIGS. 1 through 8. The leaf portion 52 and the pintle portion 51 both upstand generally laterally from leg member 46A, but in an opposite direction from the pintle portion 51. When three leg members 46A are interconnected with their respective individual pintle portions 51 and leaf portions 52 to form a triangular assembly of the type generally shown in FIG. 3, it will be appreciated that any two of the resulting hinge members will have their leaf portions 52 operably interconnected with a pintle portion 51 on the same side of one of the leg members 46A while the third resulting hinge member faces in an opposite direction on the other side of the leg member 46A. In this way, the desired collapsability in a triangular assembly is achieved while at the same time permitting complete interchangeability of the leg members 46A, if desired. As a practical matter, however, it is sometimes preferred to have, in the practice of the present invention, a pedestal means integrally formed with the one leg member which forms the base or bottom portion of a triangular assembly of this invention, for reasons of economy in manufacture. If such pedestal means is not so attached to such leg member integrally, the pedestal can be secured to such leg member by any convenient means, such as by adhesives, screws, or the like thereby preserving complete interchangeability for leg members 46A.

Even if the various leg members comprising a triangular assembly are not completely interchangeable with one another (see embodiment of FIGS. 1–8), the present invention still permits one to replace an individual one of such leg members without the need to replace the entire triangular assembly in the event of injury to any one of the leg members, as those skilled in the art will readily appreciate.

In a preferred form of triangular assembly 16, each leaf portion 36 has an integrally formed flattened area 39 on an inside face of its terminal portion 37 which is adapted to coact with flattened areas 46 and 47 present on each pintle portion 34. Thus, in a hinge member 31, 32 or 33, when a leg member 20, 21 or 22, as the case may be, revolves about the terminal portion 38 of pintle portion 34, the terminal portion 37 with its hook like configuration is in its position of maximum aperture, and is in its minimum aperture when such leg members 20, 21 or 22 are in either their assembled configuration or in their dissembled configuration. The apex or crown section of terminal portion 37 is preferably, and as shown in the FIGS. 4 and 5, somewhat flattened to better permit and control desired yielding lateral flexural movements of terminal portion 37 (relative to the pin in terminal portion 38).

Other and further embodiments and variations of the present invention will become apparent to those skilled in the art from a reading of the present specification taken together with the drawings, and no undue limitations are to be inferred or implied from the present disclosure.

We claim:

1. A collapsible assembly adapted to utilization as a warning device comprising
    A. three leg members adapted to coact together in abutting end-to-end relationship to form a triangle, the outside perimeter portion of each one of said leg members being thickened relative to the adjacent inside perimeter portion thereof.
    B. three hinge means, each hinge means being adapted to demountably interconnect a different one pair of abutting ends of said leg members in an assembled said assembly and being further adapted to permit each said abutting pair of leg members to fold from such an abutting configuration in an assembled said assembly to an adjacent side-by-side configuration in a disassembled said assembly, said folding being about an axis which is generally normal to the third said leg member when another one of said hinge means is demountably disconnected between the abutting ends of that one pair of said leg members associated with said another hinge means,
    C. each of such hinge means comprising a pintle portion and a leaf portion, each pintle portion being rigidly interconnected with one end of each leg member at the inside perimeter portion thereof, and each leaf portion being rigidly interconnected with the opposite end of each such leg member at the inside perimeter portion thereof,
    D. each leaf portion having a terminal portion which upstands generally laterally from its associated leg member and which terminates in a cross-sectionally J-shaped configuration,
    E. each pintle portion having a terminal portion which upstands generally laterally from its associated leg member and which terminates in a pin configuration, and which is adapted to make mating engagement within said terminal portion of the adjacent one of said leaf portions in an assembled said assembly,
    F. each of said leaf portions being adapted to exert a yielding spring bias against the said pin configuration of the adjacent one of said pintle portions engaged therewith in an assembled said assembly, and
    G. positioning means functionally associated with the outside perimeter portion of one of said leg members and adapted to mount an assembled said assembly in an upright position.

2. The assembly of claim 1, wherein each leg member has, at one end thereof, a said pintle portion integrally formed therewith, and, at the other end thereof, a said leaf portion integrally formed therewith.

3. The assembly claim 1, wherein, in each pintle portion, said pin configuration has a pair of longitudinally extending, diametrically opposed flattened regions adapted to coact with its adjacent said leaf portion engaged therewith in an assembled said assembly and in a disassembled said assembly to augment the rigidity between adjacent leg members by such coaction.

4. The assembly of claim 1, wherein said three leg members are adapted to form generally an equilateral triangle in an assembled said assembly.

5. The assembly of claim 1, wherein said leg members are generally symmetrical and similar to one another, and each end of each leg member has both a pintle portion and a leaf portion, each of such respective portions both upstanding generally laterally from their associated one leg member end but in opposed directions relative to one another.

6. The assembly of claim 5 wherein all of said pintle portions and all of said leaf portions are integrally formed with their respective leg members.

* * * * *